(12) United States Patent
Flumeri et al.

(10) Patent No.: US 12,187,136 B2
(45) Date of Patent: Jan. 7, 2025

(54) METHOD FOR DETERMINING AN OPTIMIZED TORQUE DISTRIBUTION TO THE DRIVE WHEELS OF A ROAD VEHICLE AND RELATIVE ROAD VEHICLE

(71) Applicant: FERRARI S.p.A., Modena (IT)

(72) Inventors: Alessandro Flumeri, Modena (IT); Francesca Mincigrucci, Modena (IT); Stefano Varisco, Modena (IT)

(73) Assignee: FERRARI S.P.A., Modena (IT)

(*) Notice: Subject to any disclaimer, the term of this patent is extended or adjusted under 35 U.S.C. 154(b) by 259 days.

(21) Appl. No.: 17/872,413

(22) Filed: Jul. 25, 2022

(65) Prior Publication Data

US 2023/0051786 A1   Feb. 16, 2023

(30) Foreign Application Priority Data

Aug. 4, 2021   (IT) .......................... 102021000021065

(51) Int. Cl.
- *B60L 15/20* (2006.01)
- *B60K 1/02* (2006.01)
- *B60L 15/32* (2006.01)

(52) U.S. Cl.
CPC ............ B60L 15/2036 (2013.01); B60K 1/02 (2013.01); B60L 15/32 (2013.01); *B60L 2240/16* (2013.01); *B60L 2240/18* (2013.01); *B60L 2240/22* (2013.01); *B60L 2240/24* (2013.01); *B60L 2240/423* (2013.01); *B60L 2260/28* (2013.01)

(58) Field of Classification Search
CPC .................................................. B60L 15/2036
See application file for complete search history.

(56) References Cited

U.S. PATENT DOCUMENTS

| | | | |
|---|---|---|---|
| 6,528,959 B2* | 3/2003 | Kitano | B60T 8/1769 318/58 |
| 8,483,926 B2* | 7/2013 | Shiozawa | B62D 6/005 701/90 |
| 10,352,424 B2* | 7/2019 | Chu | F16H 48/36 |
| 10,814,727 B2* | 10/2020 | Zhao | B60L 15/2009 |
| 2022/0396312 A1* | 12/2022 | Flumeri | B60L 3/106 |
| 2023/0051786 A1* | 2/2023 | Flumeri | B60L 15/2036 |

FOREIGN PATENT DOCUMENTS

| CN | 107187337 B | 8/2019 |
|---|---|---|
| CN | 113085578 A | 7/2021 |
| EP | 2484572 A1 | 8/2012 |

OTHER PUBLICATIONS

Search Report for Italian Patent Application No. 102021000021065 mailed Mar. 31, 2022.

\* cited by examiner

*Primary Examiner* — Michael A Berns
(74) *Attorney, Agent, or Firm* — CANTOR COLBURN LLP (57) ABSTRACT

A method for determining an optimized torque distribution to the wheels of a road vehicle comprising the steps of determining a table of distribution of the torque between a front axle and a rear axle; determining a second table and a third table of distribution of the torque between a right wheel and a left wheel of the rear axle and of the front axle, respectively; detecting the current longitudinal dynamics; using the first, the second and the third table to determine a current value of the first, of the second and of the third distribution factor, respectively, based on the current longitudinal speed and on the current longitudinal acceleration of the road vehicle.

14 Claims, 7 Drawing Sheets

METHOD FOR DETERMINING AN OPTIMIZED TORQUE DISTRIBUTION TO THE DRIVE WHEELS OF A ROAD VEHICLE AND RELATIVE ROAD VEHICLE

CROSS-REFERENCE TO RELATED APPLICATIONS

This patent application claims priority from Italian patent application no. 102021000021065 filed on Aug. 4, 2021, the entire disclosure of which is incorporated herein by reference.

TECHNICAL SECTOR

The invention relates to a method for determining an optimized torque distribution to the drive wheels of a road vehicle; the invention further relates to a relative road vehicle configured to carry out said method.

In particular, the invention finds advantageous, though non-exclusive application in the torque control of a road vehicle provided with independent drive wheels, preferably each operated by a respective electric motor, to which explicit reference will be made in the description below without because of this losing in generality. Furthermore, in particular, the invention finds advantageous, though non-exclusive application in the sizing of the aforesaid electric motors.

PRIOR ART

Algorithms are known, which are used to define the distribution of the torque delivered by one or more powertrain systems to the drive wheels of a road vehicle.

In the last few years, different technological solutions were offered and implemented concerning traction controls, brake controls or torque distribution controls for a vehicle. In these technologies, the management of the torque delivered by said one or more motors and/or active differentials plays a crucial role in performances and in the safety of the road vehicle.

Torque distribution is usually adjusted by devices such as self-locking differentials, which distribute the torque to the wheels of a same axle in a differentiated manner; for example, according to patent application WO2004087453A1, while driving along a bend, the control unit progressively decreases the percentage of locking of the self-locking differential (namely, it "opens" the clutch of the self-locking differential in order to transfer a greater quantity of torque to the drive wheel rotating more quickly, namely to the wheel on the outside of the bend), in case of pressing of the accelerator pedal, in order to improve both the stability of the road vehicle and the acceleration performances along the bend; in particular, the reduction in the percentage of locking of the self-locking differential is proportional to the lateral acceleration of the road vehicle, to the driving speed of the road vehicle, to the torque delivered by the engine and/or the gear engaged in the transmission.

According to patent application WO2004087453A1, while driving along a bend at a substantially constant speed, the control unit estimates the state of grip of the drive wheels to the road surface and consequently cancels the percentage of locking of the self-locking differential, when the state of grip of the drive wheels to the road surface is far from the grip limit, progressively increases the percentage of locking of the self-locking differential, when the state of grip of the drive wheels to the road surface gets close to the grip limit, and finally reduces the percentage of locking of the self-locking differential up to the zero value, when the state of grip of the drive wheels to the road surface is very close to the grip limit.

Therefore, known solutions involve trying to maximize performances and car safety through the search for an ideal distribution of the torque delivered; this principle is commonly known as "torque vectoring".

With the advent of full electric vehicles, four-wheel drive was generally implemented, at first, with two independent electric motors, one for each axle of the vehicle. In this case, torque vectoring between the front and rear axle is only a matter of electronic control of the distribution of power between the two motors. Furthermore, torque vectoring can more easily be implemented by means of two electric motors located on the same axle. In particular, in case of electric vehicles with for electric motor actuators, one for each wheel, the same total torque delivered to the wheel and the same yaw moment can be generated through a basically infinite number of distributions of torque to the wheels. Due to the very large number of variables than can determine these distributions, a possible calculation of ideal solutions requires computing times that are extremely long (potentially unlimited) and, therefore, manufacturers need to determine parameters that can overcome these obstacles. Energy efficiency usually is the criterion mostly used to distribute torque to the single wheels.

However, in high-performance vehicles, energy efficiency is an important parameter, though not always as essential as performances (which are maximized both through direct torque control and through a proper sizing of the motors, so as not to make the road vehicle too heavy).

DESCRIPTION OF THE INVENTION

The object of the invention is to provide a method for determining an optimized torque distribution to the drive wheels of a road vehicle and a relative vehicle, which are at least partially free from the drawbacks described above, are easy and economical to be implemented and manufactured and, in particular, maximize performances and/or safety while driving along a track.

According to the invention there are provided a method for determining an optimized torque distribution to the drive wheels of a road vehicle and a relative vehicle according to the appended claims.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
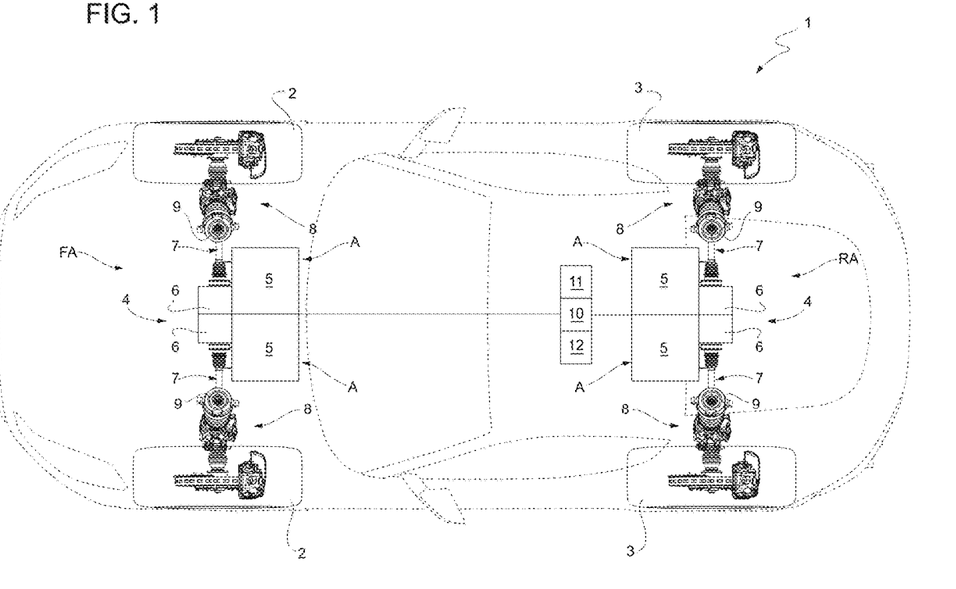
FIG. 1 is a schematic plan view of a road vehicle according to the invention and provided with four separate and independent motors.

In FIG. 1, number 1 indicates, as a whole, a road vehicle provided with two front wheels 2 and two rear wheels 3 (hence, belonging to a same axle, namely the rear one). The vehicle 1 is a four-wheel drive vehicle and, therefore, both the front wheels 2 and the rear wheels 3 receive torque from one or more powertrain systems 4.

Hence, the powertrain system 4 is configured to deliver torque to said at least four 2, 3 drive wheels in an at least partially (in particular, totally) independent manner through respective actuators A.

In particular, the powertrain system 4 comprises four electric motors 5, each independently operating a respective drive wheel 2 3.

The electric motors 5 are preferably arranged in a longitudinal front and rear position as well as transversely at the centre. Each one of said electric motors 5 is mechanically connected (by means of reduction or transmission elements 6) to the respective wheel 2 or 3 through a respective axle shaft 7, which is integral to a respective front or rear drive wheel 2 or 3.

In other non-limiting cases, which are not shown herein, the powertrain system 4 comprises a smaller number of electric motors, which independently deliver torque to each wheel, for example through active differentials (which are known and, therefore, are not described in detail).

According to some non-limiting embodiments, the powertrain system 4 comprises, alternatively or in addition to the electric motors, a heat engine.

Each wheel 2 or 3 is mechanically connected to a frame of the road vehicle 1 by means of a suspension 8 (partially shown in FIG. 1), which is provided with an electronically controlled shock absorber 9, namely provided with an electric actuator, which can change (namely, increase or decrease) the damping of the electronically controlled shock absorber 9. By way of example, the electric actuator of each electronically controlled shock absorber 9 could comprise one or more solenoid valves, which modulate the dimension of the holes for the passage of oil inside the electronically controlled shock absorber 9, or it could comprise a magnetic-rheological fluid, which changes its physical properties depending on an applied magnetic field.

The road vehicle 1 comprises an electronic control unit 10 ("ECU"), which, among other things, processes a plurality of data items and adjusts the behaviour of the road vehicle 1 both while it drives along a straight road and while it drives along a bend by acting, as described more in detail below, for example, upon the torque delivered by the electric motors 5 to the drive wheels 2 or 3 and, if necessary, in collaboration with the shock absorbers 9 of the suspensions 8. The control unit 10 can physically consist of one single device or of different devices separate from one another and communicating with one another through the CAN network of the road vehicle 1.

Figure 2:
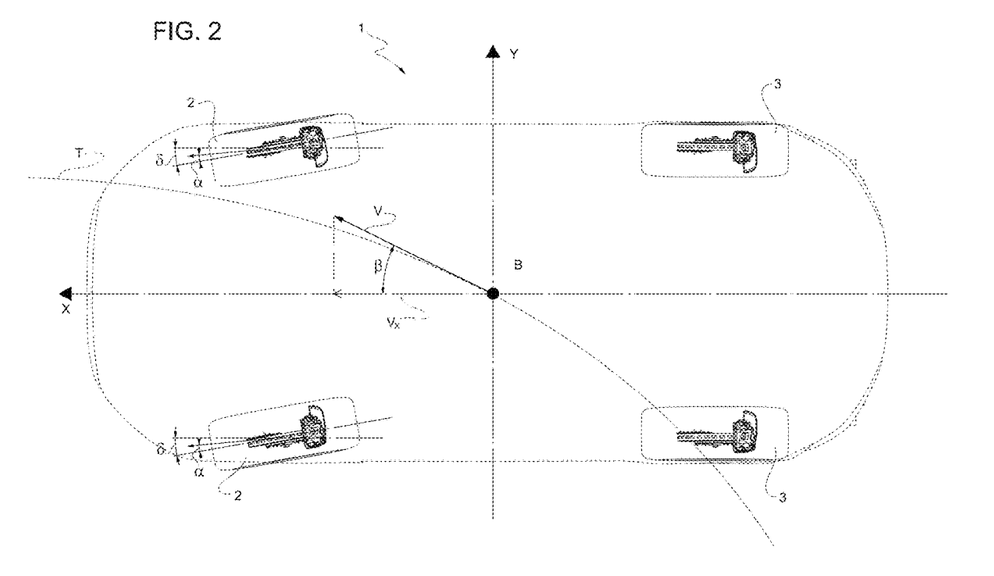
FIG. 2 is a schematic view of the road vehicle of FIG. 1 while driving along a bend, highlighting the trajectory, the driving speed and the attitude angle.

In particular, the road vehicle 1 comprises at least one detection device 11 configured to detect (current, instant-by-instant) longitudinal dynamics of the road vehicle 1. The term "longitudinal dynamics" identifies, in particular, at least the longitudinal speed Vx (FIG. 2) and the longitudinal acceleration Ax of the road vehicle 1. More in particular, the longitudinal dynamics comprise at least the dynamic distribution of the weights of the road vehicle 1, in particular as a function of a torque TR requested by the driver, for example depending on the position of the accelerator pedal.

According to some non-limiting embodiments, the detection device 11 is configured to detect the speed V of the vehicle 1 (FIG. 2), which is preferably detected by means of speed sensors arranged in the area of the wheels 2, 3; and, for example, by means of one or more inertial measuring units (which are known and, therefore, are not described in detail), the yaw rate W' of the road vehicle 1. According to the non-limiting embodiment of FIG. 2, advantageously, though not necessarily, the control unit 10 is configured to process, when driving along a bend, an attitude angle β of the road vehicle 1 (namely, the angle comprised between the longitudinal axis x of the road vehicle 1 and the direction of the driving speed V of the road vehicle 1 in the centre of gravity B). It should be pointed out that the attitude angle β is different from the yaw angle (namely, the angle comprised between the longitudinal axis x of the road vehicle 1 and a fixed ground reference), since the road vehicle 1 can assume the same yaw angle in the plane, though assuming very different attitude angles β and vice versa.

Preferably, the control unit 10 is configured to process the steering angle δ (shown in the non-limiting embodiment of FIG. 2) of the wheel 2, 3 as a function of the angle of the steering wheel.

Advantageously, though not necessarily, the control unit 10 is configured to cyclically process, as a function of the current state variables V, Ψ' of the vehicle and, preferably, of the attitude angle β and of the steering angle 5, a current slip angle α of said wheel 2, 3 of the road vehicle 1.

In particular, the control unit 10 is configured to process a yaw moment Mz of the vehicle 1 as a function of the data detected by the detection device 11.

Preferably, the control unit 10 is configured to receive, from the detection device 11, at least the longitudinal speed Vx and the longitudinal acceleration Ax of the road vehicle 1.

The road vehicle 1 further comprises a storage unit 12, where there is recorded a table ST' of distribution of the torque TR (requested, for example, by the driver through an accelerator pedal) between a front axle FA (which determines the rotation of the wheels 2) and a rear axle RA (which determines the rotation of the wheels 3) of the road vehicle 1, which provides a curve DC' representative of a factor AWDS of distribution of the torque TR as a function of the variation of longitudinal dynamics (at least Ax, Vx) of the road vehicle 1.

The storage unit 12 also includes a table ST" and a table ST'" of distribution of the torque between a right wheel 2, 3 and a left wheel 2, 3, respectively, of the rear axle RA and of the front axle FA of the road vehicle 1, wherein the tables ST", ST'" provide a curve DC" and a curve DC'", respectively, representative of a factor RLS, RLS' of torque distribution, respectively, as a function of the variation of the longitudinal dynamics (at least Ax, Vx) of the road vehicle 1.

Advantageously, the control unit 10 is configured to cyclically process an optimal longitudinal distribution AWDS of the torque TR as a function of the table ST', an optimal (left and right) rear torque distribution TRL, TRR as a function of the table ST", and an optimal (left and right) front torque distribution TFL, TFR as a function of the table ST'".

In some non-limiting cases, the tables ST" and ST'" are the same.

Advantageously, though not necessarily, the control unit 10 is configured to adjust the distribution TD of torque among the actuators A (in particular, the electric motors 5) of the road vehicle 1 according to the optimal longitudinal distribution AWDS, the optimal rear distribution TRL, TRR and the optimal front distribution TFL, TFR.

According to a further aspect of the invention, there is provided a method for determining an optimized torque distribution to the drive wheels of a road vehicle.

What described so far in relation to the vehicle 1 also applies to the method described in detail below.

In particular, the method comprises (preferably, in a designing phase or empirically) the step of determining, only once, a table ST' of distribution of the torque TR (requested by the driver) between the front axle FA and the rear axle RA of the road vehicle 1, which provides the curve DC' representative of the factor AWDS of distribution of the torque TR as a function of the variation of the longitudinal dynamics (discussed above) of the road vehicle 1.

The method further comprises the step of determining (preferably, in a designing phase or empirically), only once, the tables ST" and ST'" of distribution of the torque between a right wheel 2, 3 and a left wheel 2, 3, respectively, of the rear axle RA and of the front axle FA of the road vehicle 1, wherein the tables ST" and ST'" respectively provide the curves DC", DC'" respectively representative of the torque distribution factors RLS, RLS' as a function of the variation of the longitudinal dynamics of the road vehicle 1.

In addition, the method entails detecting, in particular by means of the detection device 11, at least the current longitudinal dynamics of the road vehicle 1, in particular while driving along a bend.

Advantageously, the method comprises the further step of using the tables ST', ST" and ST'" to respectively determine a current value of the distribution factors AWDS, RLS, RLS', based on the current longitudinal speed Vx and on the current longitudinal acceleration Ax of the road vehicle 1.

In particular, wherein the distribution factors AWDS, RLS, RLS' are configured to maximize, for the current longitudinal speed Vx and the current longitudinal acceleration Ax, the lateral acceleration (Ay) of the road vehicle 1.

Figure 3:
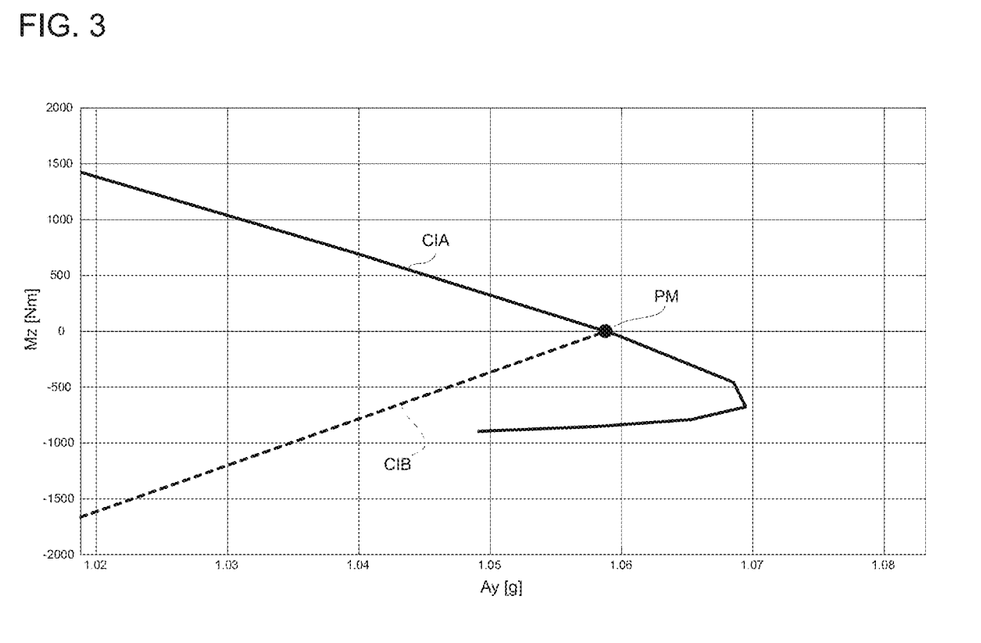
FIG. 3 is a schematic diagram showing a yaw moment diagram for the calculation of a point of maximum performance.

According to the non-limiting embodiment of FIG. 3, the method comprises, in order to calculate a point of a table ST', ST" or ST'", the step of determining a point PM of maximum performance by imposing a steering wheel angle (namely, a steering angle δ) and an attitude angle β of the road vehicle 1 and by calculating the maximum lateral acceleration Ay possible for the road vehicle 1 under these conditions. In particular, FIG. 3 shows a so-called yaw moment diagram, wherein the abscissa axis is defined by the lateral acceleration Ay of the vehicle (for example, measured in g) and the ordinate axis is defined by the yaw moment Mz (for example, measured in Nm).

In particular, the method entails imposing, by means of said diagram, a steering wheel angle (namely, a steering angle δ) and an attitude angle β of the road vehicle 1, obtaining, as an output, the lateral acceleration Ay of the car More in particular, the method entails, in this step, further imposing stability and stationarity conditions of the road vehicle 1. In detail, the term "stability" indicates the physical meaning of the word, namely a condition in which the road vehicle 1 tends to go back to a straight balance condition upon removal of the perturbation (namely, the commands given by the driver, in particular the steering ones) that removed it from its balance point. The term "stationarity", on the other hand, indicates the ability of a vehicle configuration to maintain the same dynamic conditions (namely, the longitudinal Ax and lateral Ay accelerations) for a potentially unlimited amount of time. In other words, the stationarity condition taken into account corresponds to the condition in which the yaw moment Mz is zero.

In the non-limiting embodiment of FIG. 3, the point PM of maximum performance is determined by the intersection of an iso curve CIA of the steering wheel angle (namely, an isocost line in which the steering wheel angle—namely, the steering angle δ—remains constant) and of a second iso curve CIB of the attitude angle β (namely, an isocost curve in which the attitude angle remains constant). In particular, the intersection between the iso curve CIA of the steering wheel angle and the iso curve CIB of the attitude angle β occurs in a stationary condition of the vehicle 1, namely, having a zero yaw moment.

Therefore, according to the non-limiting embodiment of FIG. 3, the point PM of maximum performance corresponds to the point of stationary maximum performance (maximum Ay) (namely, again, with the yaw moment Mz equal to zero, which allows a same vehicle condition to be potentially maintained, in particular in terms of the aforesaid angles δ and β, for an infinite time). In particular, the point PM of maximum performance is calculated by imposing a given torque distribution, in the light of which the curves CIA and CIB are respectively processed taking into account the combinations of lateral acceleration Ay and yaw moment Mz that respectively keep the steering wheel angle and the attitude angle β constant (namely, by varying the attitude angle β to define the curve CIA and the steering wheel angle to define the curve CIB, respectively).

In particular, in the non-limiting embodiment of FIG. 3, the condition of stability (imposed according to the method described herein) is defined by the gradient of the curve CIA in the point in which it intersects the abscissa axis (namely, Mz=0). Therefore, in point PM of maximum performance, the method entails imposing that the gradient of the curve CIA is negative, namely that the static margin is negative. Briefly, the imposition of the stability condition behaves like a low-pass filter, which only admits curves CIA whose gradients are below a given threshold, namely negative.

Advantageously, though not necessarily, the method comprises a first optimization step, during which a plurality of points PM of maximum performance are iteratively processed so as to work out which attitude angle β and steering angle (namely, δ) can, given a certain configuration (geometric parameters, mass parameters and torque distribution parameters) of the road vehicle 1 and a certain distribution of the torques, maximize the lateral acceleration Ay, in particular maintaining the aforesaid conditions of stability, stationarity and longitudinal acceleration Ax. In other words, the first optimization step repeats the calculation of the point PM of maximum performance (namely, calculates the curves CIB and CIA) for different steering and attitude angles, so as to determine which combination maximizes the lateral acceleration Ay for a given vehicle condition. In particular, the first optimization step calculates which steering angle and attitude angle β maximize the lateral acceleration Ay maintaining the conditions of stability, stationarity and longitudinal acceleration Ax for a given vehicle configurations.

In this way, it is possible to calculate the work point at which the 4 tyres are working and how far they are from their maximum.

In particular, in case there are longitudinal accelerations Ax other than zero, they are considered as further condition and, therefore, the solutions of the point PM of maximum performance correspond to the cases in which the wheels 2, 3 determine the maximum lateral acceleration Ay and, at the same time, also the acceleration Ax requested (for example, through the torque TR).

Advantageously, though not necessarily, the method further comprises a second optimization step, during which the aforesaid certain distribution of the torques of the first optimization step is iteratively varied, so as to obtain, for each certain distribution, a respective maximum lateral acceleration Ay obtainable by means of respective steering angles and attitude angles β; in particular, so as to obtain a total maximum lateral acceleration Ay (namely, so as to define the optimal torque distribution) by selecting the greatest one of the respective maximum lateral accelerations Ay (of each given distribution). In particular, the total maximum lateral acceleration Ay is obtainable through a respective optimal steering wheel angle (namely, optimal steering angle δ) and a respective optimal attitude angle β.

In particular, the second optimization step uses, as base, the first optimization step, varying the (three) torques distributions (AWDS, RLS, RLS'), so as to maximize performances. In detail, in the second optimization step, the control unit 10 inputs a set of three torque distributions AWDS, RLS, RLS' and repeats the first optimization step in order to determine which optimal steering wheel angle (namely, optimal steering angle δ) and which optimal attitude angle β maximize the lateral acceleration Ay. The alternation of the first and second optimization step is iteratively repeated until there is a convergence towards the torque distributions AWDS, RLS, RLS' that maximize the lateral acceleration Ay.

Advantageously, though not necessarily, the second optimization step (following the first optimization step) is carried out, at first, to determine the distribution table ST'; subsequently, the distribution table ST" and, finally, the distribution table ST'". In other words, the method preferably entails determining, first of all, the longitudinal distribution AWCS (namely, the percentage of torque for each front or rear axle FA) and, subsequently, the right/left distribution RLS of the rear axle RA and, after that, the right/left distribution RLS' of the front axle FA. In this way, great advantages are obtained in terms of calculation, continuous iterations are avoided varying both the rear distribution and the front distribution and the distribution of the rear axle is privileged as maximizing the lateral acceleration Ay of the rear wheels 3 (for they do not steer) produces a smaller inconvenience for the driver.

In some non-limiting cases, at the end of the second optimization, the tables ST', ST", ST'" are obtained repeating the steps described above for different longitudinal dynamics conditions of the vehicle, namely changing the longitudinal speed Vx and the longitudinal acceleration Ax.

Advantageously, though not necessarily, the distribution table ST' (namely, the one used to define the longitudinal torque distribution AWDS between the front axle FA and the rear axle capable of maximizing the lateral acceleration Ay) is determined starting from a certain torque distribution AWDS between the front FA axle and the rear RA axle, which is a function of the dynamic weight distribution (namely, according to known formulas, the sum of the static distribution given by the car mass and of the distribution due to longitudinal load transfers depending on the longitudinal acceleration Ax) of the road vehicle 1, so as to determine the optimal longitudinal distribution AWDS of the road vehicle 1. In this way, the longitudinal distribution AWDS is quickly determined by the control unit 10. Furthermore, assuming that the longitudinal distribution AWDS substantially is the same as the dynamic weight distribution of the road vehicle 1 basically corresponds, in particular also from an empirical point of view, to the result that would be obtained by calculating the table ST' through the first and second optimization steps. In particular, these optimal distributions AWDS, for the different possible speeds Vx and accelerations Ax, determine the curve DC'.

Preferably, though not necessarily, once the longitudinal distribution has been determined AWDS, assuming that it is substantially the same as the dynamic weight distribution of the road vehicle, the first and second optimization steps are repeated to populate the tables ST" and ST'".

Advantageously, though not necessarily, the distribution table ST" is iteratively determined by keeping the certain distribution AWDS between the front axle FA and the rear axle RA constant and by varying the distribution RLS between the right wheel 2, 3 and the left wheel 2, 3 of the rear axle RA, so as to determine an optimal rear distribution RLS that maximizes the lateral acceleration Ay of the vehicle 1 for certain longitudinal dynamics (at least Ax, Vx). In particular, these optimal distributions, for the different possible speeds Vx and accelerations Ax, determine the curve DC".

Subsequently, advantageously, though not necessarily, the distribution table ST'" is iteratively determined by keeping the optimal rear distribution RLS constant and by varying the distribution RLS' between the right wheel 2, 3 and the left wheel 2, 3 of the front axle FA, so as to determine an optimal front distribution RLS' that maximizes the lateral acceleration Ay of the vehicle 1 said certain longitudinal dynamics (at least Ax, Vx). In particular, these optimal distributions, for the different possible speeds Vx and accelerations Ax, determine the curve DC'".

In some non-limiting cases, the method comprises the further step of controlling, through the control unit 10, the actuators A, namely the electric motors 5, so as to adjust the torque of each wheel 2, 3 as a function of the distribution table ST' and/or ST" and/or ST'".

Alternatively or in addition, the method comprises the step of adjusting and, if necessary, changing the sizing of the actuators A, namely the electric motors 5, of the road vehicle 1 as a function of the distribution table ST' and/or ST" and/or ST'".

Figure 4:
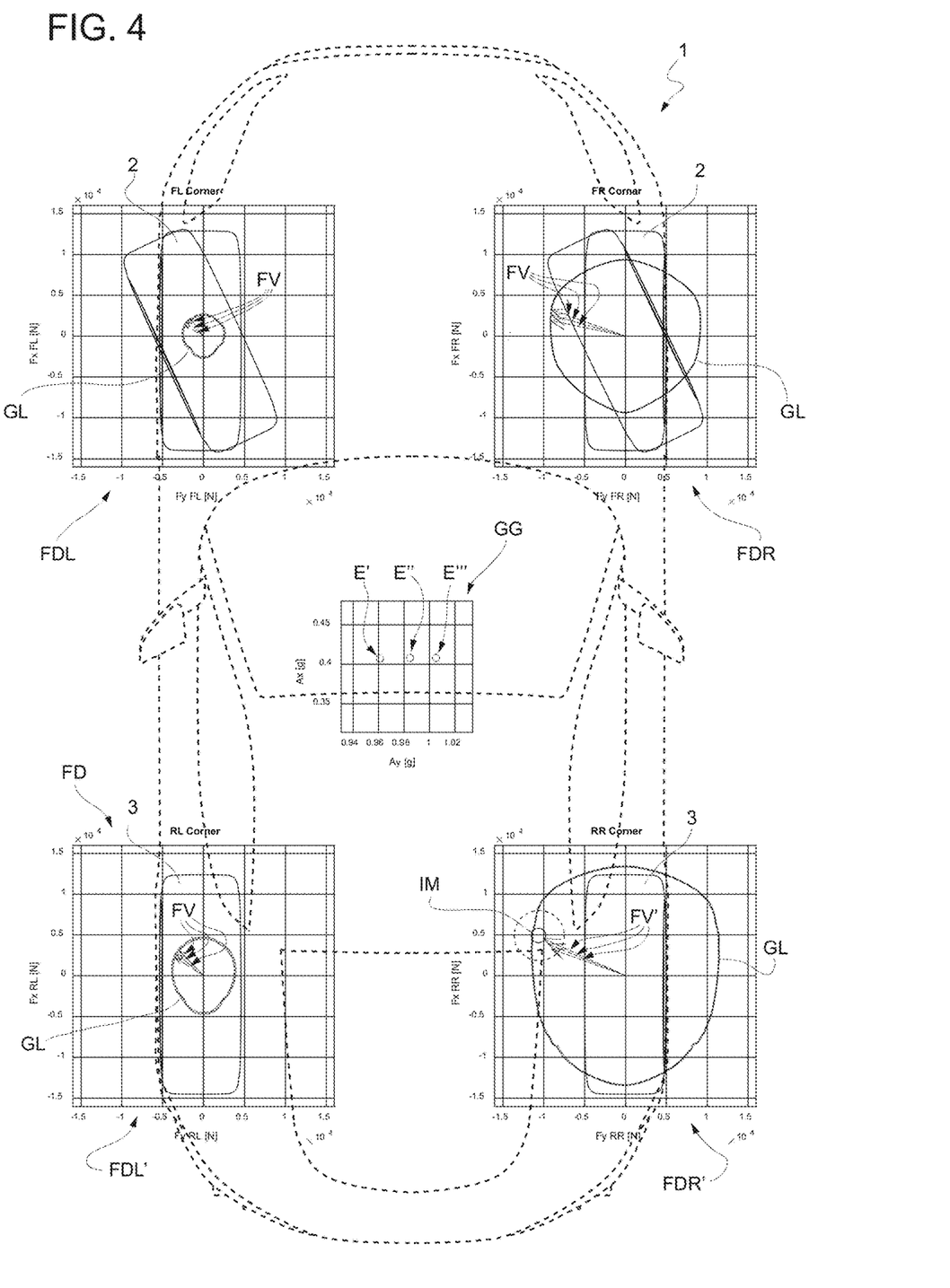
FIG. 4 schematically shows force distribution diagrams for each wheel of the road vehicle resulting from a portion of the method according to the invention.

The non-limiting embodiment of FIG. 4 schematically shows diagrams FDL, FDL', FDR, FDR' explaining the distribution of the longitudinal Fx and lateral Fy forces for each wheel 2, 3 of the road vehicle 1 resulting from a tripe example iteration E', E", E'", in which the imposed longitudinal speed is 100 Km/h and the imposed longitudinal acceleration is 0.4 g (as shown by the diagram GG at the centre of FIG. 4). In particular, example E' corresponds to an even 50% distribution AWDS, example E" corresponds to a 40% distribution (namely, 60% of the requested torque TR to the rear and 40% to the front) and example E'" corresponds to a 30% distribution (namely, 70% of the requested torque TR to the rear and 30% to the front). In particular, the closed curves indicate the grip limits GL of the wheels 2, 3 (namely, of each tyre) and substantially overlap one another for all three examples E', E", E'". More precisely, the arrows of each diagram indicate the force vectors FV, FV' applied by the ground to the wheels 2, 3 in the different conditions of the three examples. To this regard, it should be pointed out that, for the front wheels 2 and the left rear wheel 3, the maximum lateral force is already reached in the three examples E', E", E'" shown, since the force vectors FV reach the grip limit GL of the respective wheel 2, 3; on the contrary, for the right rear wheel 3, one can see how the force vector FV' improves from example E' to example E'" (namely, it moves towards the grip limit GL), though maintaining an improvement margin IM, which can subsequently be reached, also optimizing, for instance, the right/left distribution RLS of the rear axle, maximizing the lateral acceleration Ay and, hence, causing the vector FV' to reach the grip limit GL.

Figure 5:
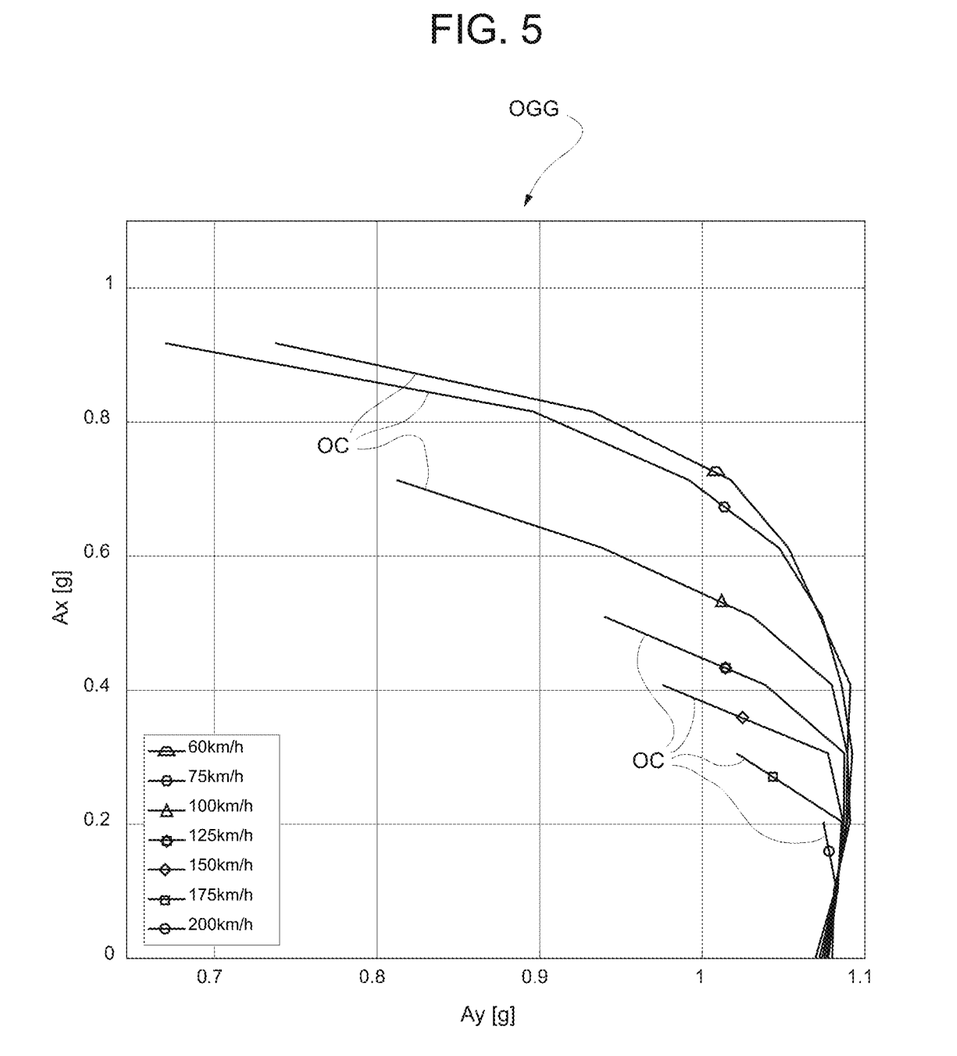
FIG. 5 schematically shows a diagram showing the optimum for the lateral acceleration and the longitudinal acceleration of the vehicle at different speeds.

The non-limiting embodiment of FIG. 5 shows an optimized diagram OGG, which can be obtained by optimizing the three optimal distributions AWDS, RLS, RLS' and by taking into account the power limits of the four electric motors 5. In other words, the diagram OGG indicates the maximum accelerations (longitudinal accelerations Ax and lateral accelerations Ay, determining the optimized curves OC) that can be performed by the road vehicle 1 at given speeds Vx (indicated in the caption of FIG. 5).

Advantageously, though not necessarily, the method entails, in particular in case the accelerations are far from the maximum ones of the diagram OGG, modulating a control factor (in particular, the torque distribution TD, more precisely the distributions RLS, RLS') proportionally to the ratio between the current acceleration Ay of the road vehicle 1 and the maximum theoretical acceleration (from the diagram OG) that the vehicle 1 could perform at that longitudinal speed Vx.

Figure 6:
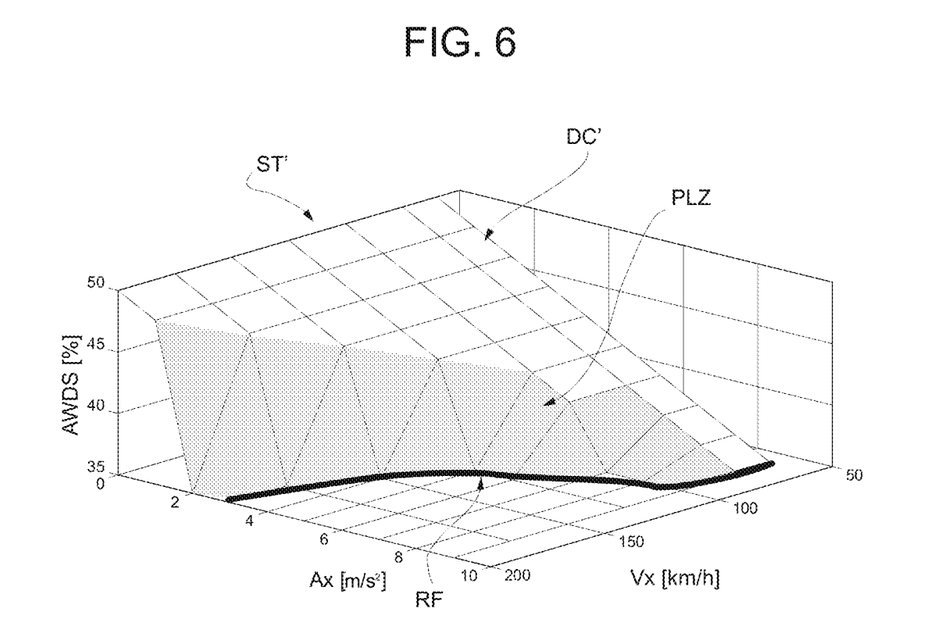
FIGS. 6 and 7 show two three-dimensional tables relating a longitudinal distribution of the torque and a rear distribution of the torque, respectively, to the current speed and longitudinal acceleration of the road vehicle.
Figure 7:
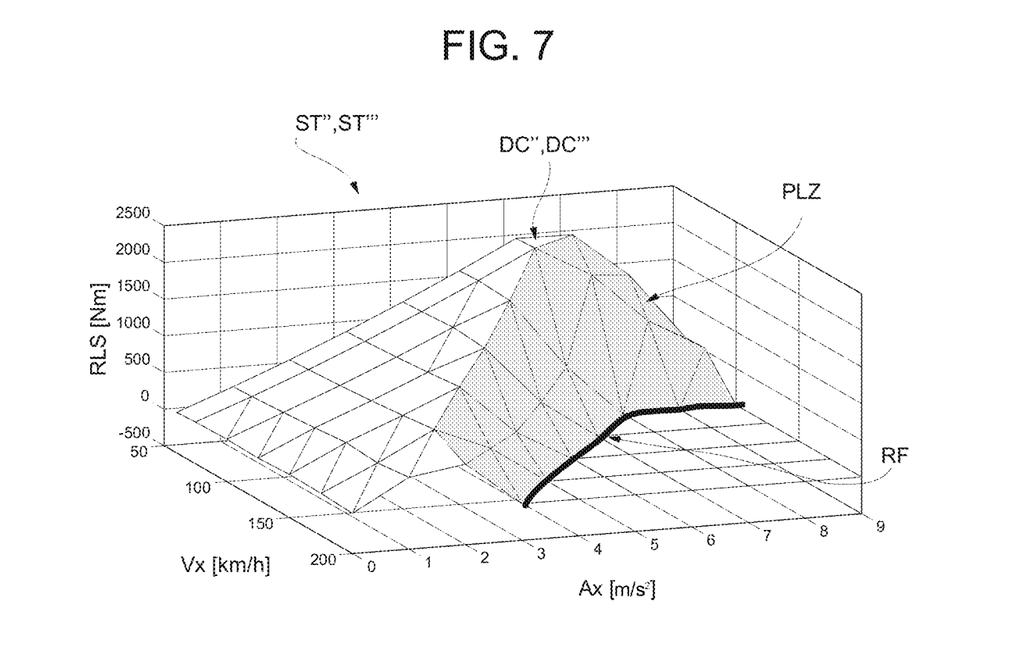

The non-limiting embodiments of FIGS. 6 and 7 show examples of distribution tables ST', ST" and ST'".

In particular, FIG. 6 shows a non-limiting embodiment of the distribution curve DC', which links the front/rear distribution AWDS of the road vehicle 1 to the current longitudinal dynamics of the vehicle, in particular to the longitudinal speed Vx and to the longitudinal acceleration Ax.

In the non limiting embodiment of FIG. 6, the distribution AWDS is defined in percentage terms, so that for a value AWDS=0 the torque distribution is equal, namely the same for both axles, whereas for a value AWDS=50 the torque distribution preferably is entirely assigned to the rear axle RA.

In the non-limiting embodiment of FIG. 7, the distribution RLS, RLS' is defined in terms of torque (Nm), so that for a value RLS, RLS'=0 the torque distribution is equal, namely the same for both axles (namely, the motors 5 of a same axle deliver the same torque), whereas for a value RLS, RLS'=1500 the difference between the right motor 5 and the left motor 5 (or vice versa) of a same axle is at least 1500 Nm.

Preferably, the torque distribution curve DC' follows the dynamic weight distribution as long as there are no power limits of the motors 5 (as a matter of fact, see the linearity of the curve segment DC' at low longitudinal accelerations Ax and/or low longitudinal speeds Vx). As the power limit of the electric motors 5 gets close (in particular, as soon as it is reached), a limited-power zone PLZ starts (indicated in grey in FIGS. 6 and 7); in order to maximize the power to the ground (the driver is requesting top performances), the installed power is entirely used as distributed and, therefore, it determines the torque distribution AWDS. In the non-limiting embodiment of FIG. 6, the limit RF of the curve DC' (rainflow) between acceleration Ax and speed Vx is equal to zero, as motors 5 with a same power distribution are assumed to be used. In other words, as the power limit of the electric motors 5 gets close, the method entails converging towards the maximum use both of the front axle FA and of the rear axle RA, so as to cause the distribution AWDS to be equal to the distributions of the installed powers of the motors 5 between the two rear and front axles.

In particular, the limit RF represents the diagram relating the maximum acceleration Ax that can be reached by the vehicle to a certain speed Vx and vice versa. In detail, at low longitudinal speeds Vx (up to circa 80 km/h) there is a substantially constant segment of the limit RF, which represents the segment in which there are not power limits (maximum torque) of the electric motors 5. In other words, in this segment, the road vehicle 1 is capable of maintaining torque and grip at the maximum value. After this substantially straight segment, there is a substantially hyperbolic portion, during which the power between the two axles remains constant and, therefore, the acceleration Ax decreases in an inversely proportional manner relative to the speed.

The non-limiting embodiment of FIG. 7 shows, in a similar manner, a curve DC", DC'" of right/left torque distribution RLS, RLS' in a same axle. In particular, what disclosed above with reference to FIG. 6 also applies to this case. In detail, as long as the longitudinal acceleration Ax is low (in particular, below 3 m/s$^2$ or more for limited speeds), the torque distribution RLS, RLS' substantially follows the right/left dynamic weight distribution of the road vehicle 1. As the limited-power zone PLZ begins (since the power limit of the electric motors 5 is getting close), the difference in the distribution RLS, RLS' goes back to zero (namely, the electric motors 5 are no longer limited) at the limit RF.

Advantageously, though not necessarily, the method entails determining, in real time, which distributions AWDS, RLS, RLS' maximize the performances (namely, the lateral acceleration Ay) of the road vehicle while driving along a track. In particular, the distributions AWDS, RLS, RLS' maximizing performances are determined by cyclically consulting the tables ST', ST", ST'". More in particular, the method entails interrogating the tables ST', ST", ST'" using, as input, the current speed Vx and the current acceleration Ax and obtaining, as output, the optimal distributions AWDS, RLS, RLS'.

Advantageously, though not necessarily, the optimal distributions AWDS, RLS, RLS' obtained by so doing are used for a real-time torque distribution control. In some non-limiting cases, the torque distribution control in an open-loop control. In other non-limiting cases, the control comprises a slip control SLC, thus becoming a closed-loop control as a function of the grip conditions of the wheels 2, 3.

The method described so far is preferably used to maximize the performances of a road vehicle 1, in particular to reduce the track lap time thereof.

Figure 8:
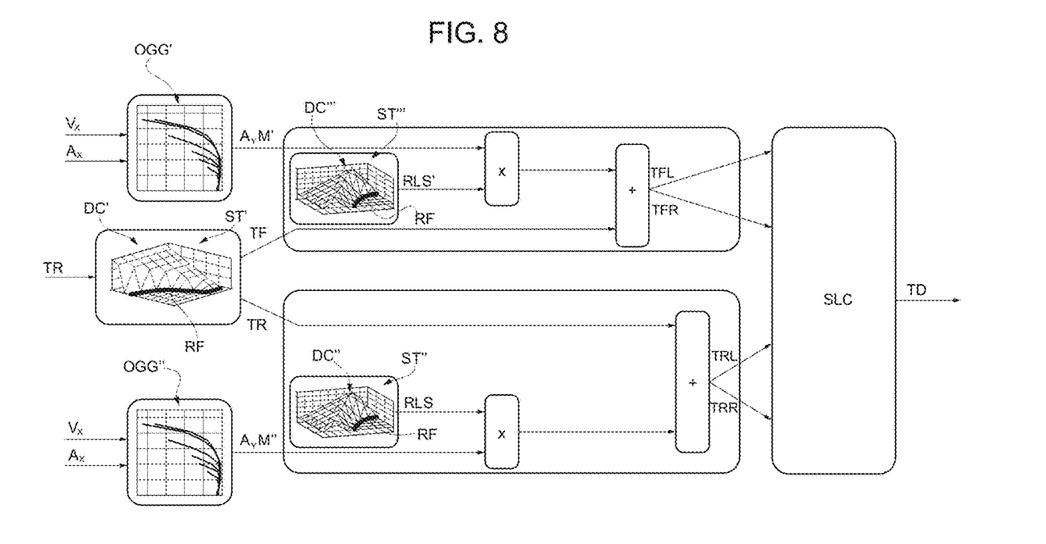
FIG. 8 schematically shows a possible logic diagram of a control unit of the vehicle according to the invention.

According to the non-limiting embodiment of FIG. 8, in use, the tables ST', ST", ST'" are used, for example by the control unit 10 of the road vehicle, to determine the optimal distributions AWDS, RLS, RLS'. In other words, the tables ST', ST", ST'" communicate to the control unit 10 which the optimal torque distributions are, especially close to the grip limit of the road vehicle 1.

In particular, the distributions RLS, RLS' are modulated with the ratio $A_YM"$, $A_YM'$ between the current lateral acceleration Ay and the maximum acceleration Ay that can be obtained and results from the diagrams OGG", OGG" as a function of the current longitudinal speed Vx and of the current longitudinal acceleration Ax. In other words, given the longitudinal dynamics Vx, Ax, the maximum Ay is calculated by means of the diagrams OGG', OGG" and, given the current lateral acceleration Ay, the ratios $A_YM"$, A_yM' to respectively modulate (namely, in a proportional manner, in detail through multiplication) the distributions RLS, RLS' are calculated.

On the other hand, as far as the distribution AWDS is concerned, given the torque TR requested by the driver, it defines the sum of the total torques TF, TR for the front axle FA and the rear axle RA, respectively. Hence, as a function of the torque TR, it is possible to calculate, by means of the table ST' and the longitudinal dynamics Vx, Ax, the distribution AWDS determining the total torques TF, TR.

After that, the two blocks containing a + sign indicate the systems of two forming equations with two unknowns (each consisting of an equation defining the difference, namely the delta, between two torques TFR, TFL or TRR, TRL and of an equation defining the sum thereof), which, once executed (in an absolutely known manner, which, therefore, is not described in detail), provide as solution the right torque TFR and the left torque TFL for the front axle FA and the right torque TRR and the left torque TRL for the rear axle RA. These torques represent the torques obtained from the optimal distributions AWDS, RLS, RLS' and, therefore, maximize the performances (namely, the lateral acceleration Ay) of the road vehicle.

Following a known slip control SLC, which is not described in detail, the vector of the total torque distribution TD containing the four torques TFR, TFL, TRR, TRL is managed by the control unit 10 controlling the respective electric motors 5 of the road vehicle accordingly.

Even though the invention described above relates to some specific embodiments, it should not be considered as limited to said embodiments, for its scope of protection also includes all those variants, changes or simplifications covered by the appended claims, such as for example different reliability criteria, a different conformation of the vehicle and of its powertrain systems, etc.

The vehicle and the method described above have many advantages.

First of all, they understand which torques have to be requested to the actuators in order to maximize the performances of the vehicle. In other words, all wheels are caused to work at their limit instant by instant.

Furthermore, the tables can be consulted with a real-time control, thus avoiding on-line computing, which could fail to ensure the efficiency of the control.

In addition, the actuators can be exploited to the maximum of their abilities, so that they can also be properly sized. In particular, for the maximum performance that is desired/obtainable by means of a given configuration of the road vehicle is known, the size of the actuators, namely of the electric motors, can be optimized, thus minimizing the weight of the vehicle.

Finally, the control method described above is simple and economic to be implemented in a road vehicle 1, for it does not require the addition of any physical component and can completely be carried out via software, exploiting architectures that normally are already present on board the road vehicle 1. It should be pointed out that the method described above does not use either a high computing ability or a large memory space and, therefore, it can be implemented in a control unit with no need for updates or boosts.

LIST OF THE REFERENCE NUMBERS OF THE FIGURES

| | |
|---|---|
| 1 | road vehicle |
| 2 | front wheels |
| 3 | rear wheels |
| 4 | powertrain system |
| 5 | electric motors |
| 6 | reduction gear |
| 7 | axle shaft |
| 8 | suspension |
| 9 | shock absorber |
| 10 | control unit |
| 11 | detection device |
| 12 | storage unit |
| A | actuator |
| AWDS | front/rear distribution |
| Ax | longitudinal acceleration |
| Ay | lateral acceleration |
| B | centre of gravity |
| CIA | steering angle iso curve |
| CIB | attitude angle iso curve |
| DC' | curve |
| DC'' | curve |
| DC''' | curve |
| E', E'', E''' | example |
| FA | front axle |
| FDL | front, left force diagram |
| FDL' | rear, left force diagram |
| FDR | front, right force diagram |
| FDR' | rear, right force diagram |
| FR | rear axle RA |
| FV | force vector |
| FV' | improvable force vectors |
| Fx | longitudinal force |
| Fy | lateral force |
| GL | grip limit |
| IM | improvement margin |
| Mz | yaw moment |
| OC | optimized curves |
| OGG | optimized diagram GG |
| PLZ | limited-power zone |
| RA | rear axle |
| RLS | right/left distribution |
| SLC | slip control |
| ST' | distribution table |
| ST'' | distribution table |
| ST''' | distribution table |
| T | trajectory |
| TD | torque distribution |
| TF | front axle torque |
| TR | torque request |
| TR | rear axle torque |
| V | speed |
| Vx | longitudinal speed |
| x | longitudinal axis |
| y | lateral axis |
| α | slip angle |
| β | attitude angle |
| δ | steering angle |
| Ψ' | yaw rate |

The invention claimed is:

1. A method for determining an optimized torque distribution to wheels (2, 3) of a road vehicle (1); the road vehicle (1) comprising an actuator (A, 5) for each of the wheels (2, 3) to independently control a torque (TFR, TFL, TRR, TRL) associated with each wheel; the method comprising:
   determining once a first table (ST') of torque distribution between a front axle (FA) and a rear axle (RA) of the road vehicle (1), which provides a first curve (DC') representative of a first torque distribution factor (AWDS) as a function of a variation of longitudinal dynamics of longitudinal acceleration and longitudinal speed (Ax, Vx), respectively, of the road vehicle (1);
   determining once a second (ST'') and a third (ST''') torque distribution table between a right (2, 3) wheel and a left (2, 3) wheel, respectively, of the rear (RA) axle and the front (FA) axle of the road vehicle (1), wherein the second and third torque distribution tables (ST", ST'") provide second and third curves (DC", DC'"), respectively, representative of a second torque distribution factor (RLS) and a third (RLS') torque distribution factor as a function of the variation of the longitudinal dynamics of the road vehicle (1);

detecting a current state of the longitudinal dynamics of the road vehicle (1) while driving through a curve;

using the first, second and third torque distribution tables (ST', ST", ST'") to determine a present value of the first torque distribution factor (AWDS), the second torque distribution factor (RLS) and the third torque distribution factor (RLS'), respectively, based on the present longitudinal (Vx) speed and the present longitudinal (Ax) acceleration of the road vehicle (1);

wherein the first torque distribution factor (AWDS), the second torque distribution factor (RLS) and third torque distribution factor (RLS') distribution factors are configured to maximize, for a current longitudinal speed (Vx) and current longitudinal acceleration (Ax), a lateral acceleration (Ay) of the road vehicle (1);

determining a point (PM) of maximum performance in order to calculate a point of the first, second or third curve (DC', DC", DC'") by imposing a steering angle and an attitude angle (β) of the road vehicle (1) and calculating the maximum of the lateral acceleration (Ay) of the road vehicle (1) under said conditions;

wherein the point (PM) of maximum performance is determined by an intersection of a first curve (CIA) iso of the steering angle and a second curve (CIB) iso of the attitude angle.

2. The method according to claim 1, wherein the step of determining a point (PM) of maximum performance is carried out by means of a yaw moment (Mz) diagram.

3. The method according to claim 1, wherein the intersection of the two curves (CIA, CIB) iso occurs in a stationary condition of the vehicle (1).

4. The method according to claim 1, further comprising a first optimization step during which a plurality of points (PM) of the maximum performance are iteratively processed so as to work out which are the attitude angle (β) and the steering angle that, given a certain configuration of the road vehicle (1) and a certain distribution of the torques, maximize the lateral acceleration (Ay), maintaining constraints of stability, stationarity and longitudinal acceleration (Ax).

5. The method according to claim 4, further comprising a second optimization step during which the first, second and third torque distribution factors (AWDS, RLS, RLS') of the first optimization step are iteratively varied, so as to obtain, for each of the first, second and third torque distribution factors (AWDS, RLS, RLS'), a respective maximum lateral acceleration (Ay) obtainable via the respective steering angle and the attitude angle (β); and obtain a total maximum lateral acceleration (Ay) by selecting the greater of the respective maximum lateral accelerations (Ay); the total maximum lateral acceleration (Ay) being obtainable through the respective steering angle and the optimal attitude angle (β).

6. The method according to claim 4, wherein the second optimization step is carried out firstly to determine the first (ST') torque distribution table; then the second (ST") torque distribution table; and finally the third (ST'") torque distribution table.

7. The method according to claim 6, wherein the first (ST') torque distribution table is determined starting from the first torque distribution factor (AWDS) between the front (FA) axle and the rear (RA) axle which is function of a dynamic weight distribution of the road vehicle (1) so as to determine an optimal longitudinal distribution of the road vehicle (1).

8. The method according to claim 7, wherein the second (ST") distribution table is iteratively determined by holding constant the longitudinal distribution between the front (FA) axle and the rear (RA) axle and varying the second torque distribution factor (RLS) between the (2, 3) right wheel and the (2, 3) left wheel of the rear (RA) axle so as to determine an optimal rear distribution that maximizes the lateral acceleration (Ay) of the vehicle (1) for a certain longitudinal dynamic.

9. The method according to claim 8, wherein the third torque distribution table (ST'") is iteratively determined by holding the optimal rear distribution constant and varying the third torque distribution factor (RLS') between the (2, 3) right wheel and the (2, 3) left wheel of the front axle (FA) so as to determine an optimal front optimal distribution that maximizes the lateral acceleration (Ay) of the vehicle (1) for the certain longitudinal dynamic.

10. The method according to claim 1 further comprising the further step of controlling the actuators (A, 5) so as to adjust the torque (TFR, TFL, TRR, TRL) of each wheel (2, 3) according to the first and/or second and/or third torque distribution table (ST', ST", ST'").

11. The method according to claim 1 further comprising adjusting a sizing the actuators (A, 5) of the road vehicle (1) according to the first and/or second and/or third torque distribution table (ST', ST", ST'").

12. A road vehicle (1) comprising:
at least four (2, 3) driving wheels;
a powertrain system (4) configured to deliver torque (TFR, TFL, TRR, TRL) at least partially independently to the at least four (2, 3) driving wheels via respective actuators (A, 5);
at least one detection device (11) configured to detect a longitudinal dynamic comprising a longitudinal acceleration (Ax) and a longitudinal speed (Vx) of the road vehicle (1);
a control unit (10) configured to receive from the at least one detection device (11) at least the longitudinal speed (Vx) and the longitudinal acceleration (Ax) of the road vehicle (1);
a storage unit (12), within which are recorded a first torque distribution table (ST') between a front axle (FA) and a rear axle (RA) of the road vehicle (1), which provides a first curve (DC') representative of a first torque distribution factor (AWDS) as a function of the variation of longitudinal dynamics of the road vehicle (1); and a second (ST") and a third torque distribution table (ST'") between a right (2, 3) wheel and a left (2, 3) wheel, respectively, of the rear (RA) axle and the front (FA) axle of the road vehicle (1), wherein the second and third torque distribution tables (ST") provide second and third curves (DC", DC'"), respectively, representative of second and third torque distribution factors (RLS, RLS') as a function of variation in the longitudinal dynamics of the longitudinal acceleration (Ax) and the longitudinal speed (Vx) of the road vehicle (1);
wherein the control unit (10) is configured to cyclically process a longitudinal optimal torque distribution as a function of the first torque distribution table (ST'), a rear optimal torque distribution as a function of the second torque distribution table (ST"), and a front optimal torque distribution as a function of the third torque distribution table (ST'");

wherein the control unit (10) is further configured to determine a point (PM) of maximum performance by imposing a steering angle and an attitude angle (β) of the road vehicle (1) and calculating a maximum lateral acceleration (Ay) of the road vehicle (1) so that a point of maximum performance associated with the first, second or third curves (DC', DC'', DC''') can be calculated;

wherein the point (PM) of maximum performance is determined by an intersection of a first curve (CIA) iso of the steering angle and a second curve (CIB) iso of the attitude angle.

13. The road vehicle (1) according to claim 12, wherein the control unit (10) is configured to adjust a torque distribution (TD) between the actuators (A, 5) of the road vehicle (1) in accordance with the optimal longitudinal distribution, the optimal rear distribution and the optimal front distribution.

14. The road vehicle (1) according to claim 12, wherein each actuator (A, 5) comprises an electric motor (5) configured to deliver the torque (TFR, TFL, TRR, TRL) towards a respective wheel (2, 3).

\* \* \* \* \*